(12) United States Patent
Phelps et al.

(10) Patent No.: US 8,774,395 B2
(45) Date of Patent: Jul. 8, 2014

(54) IVR RECORDING MANAGEMENT AND CONTROL

(75) Inventors: David E. Phelps, Colorado Springs, CO (US); Brian S. Badger, Divide, CO (US); John Macedo, Clearwater, FL (US); Gregory J. Bjornberg, Colorado Spings, CO (US); John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 13/323,066

(22) Filed: Dec. 12, 2011

(65) Prior Publication Data

US 2013/0148794 A1   Jun. 13, 2013

(51) Int. Cl.
H04M 3/00   (2006.01)
(52) U.S. Cl.
USPC ............ 379/266.1; 379/265.07; 379/88.18; 379/88.22; 709/203; 709/206

(58) Field of Classification Search
USPC ............. 379/265.07, 266.1, 88.18, 88.22; 709/203, 206
See application file for complete search history.

(56) References Cited

U.S. PATENT DOCUMENTS

| | | | |
|---|---|---|---|
| 2008/0059179 A1* | 3/2008 | Lagadec | 704/251 |
| 2010/0226482 A1* | 9/2010 | Naparstek et al. | 379/85 |
| 2011/0161654 A1* | 6/2011 | Margolis et al. | 713/150 |

* cited by examiner

Primary Examiner — Gerald Gauthier
Assistant Examiner — Simon King

(57) ABSTRACT

A computing device may receive a record order from a client device. The record order may include recording instructions for a communication session involving an interactive voice response recording system. The computing device may provide the record order to the interactive voice response recording system and, in response to providing the record order to the interactive voice response recording system, receive record metadata corresponding to the communication session and store the record metadata locally. The record metadata may include a storage location of record data corresponding to the communication session, and the record data may include a recording of the communication session.

19 Claims, 6 Drawing Sheets

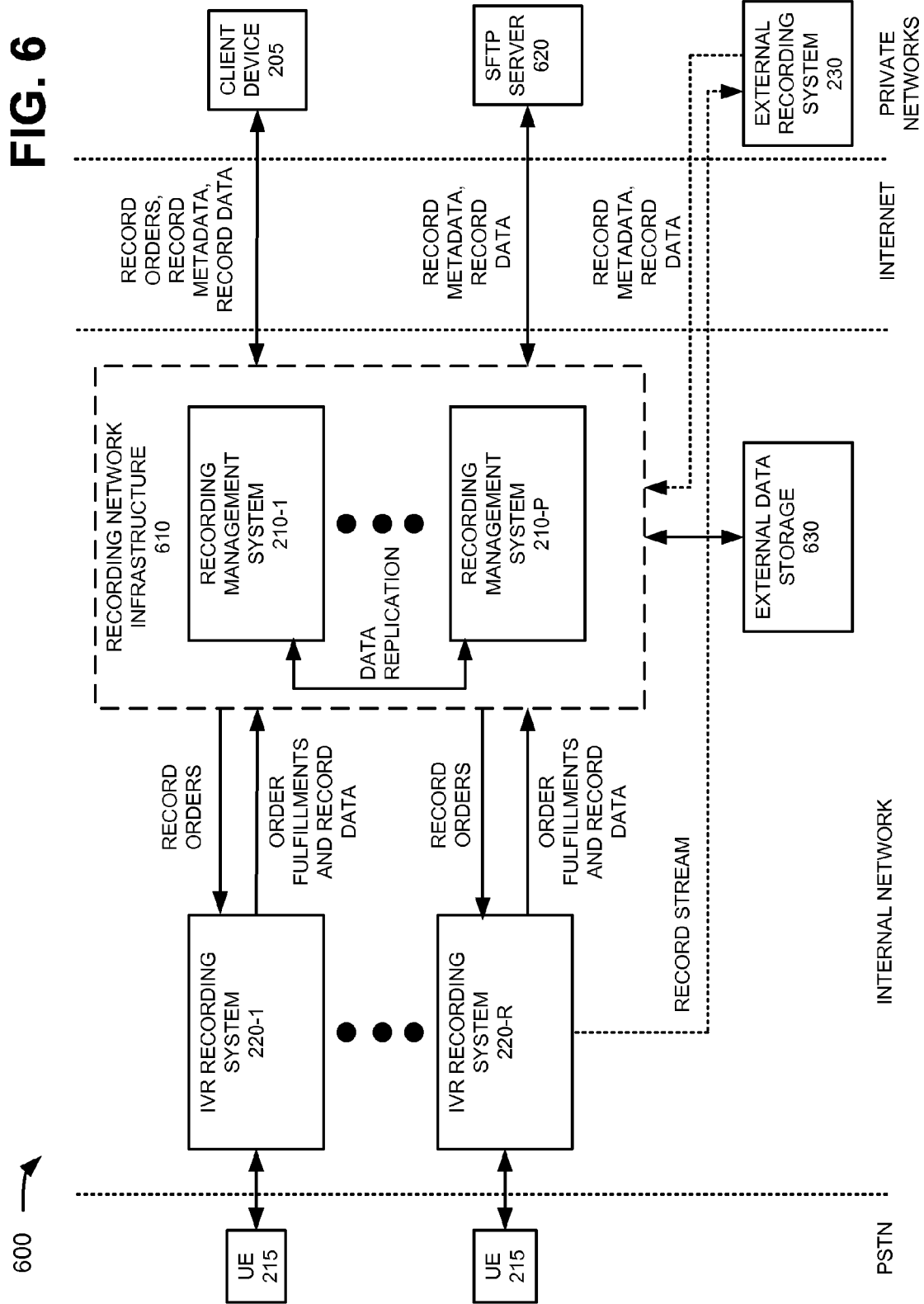

IVR RECORDING MANAGEMENT AND CONTROL

BACKGROUND

Currently available telecommunication technologies enable individuals and organizations to communicate in a variety of ways. For example, many companies and other organizations maintain call centers that individuals may call to gain access to customer service, sales support, product support, technical support, or other types of services. Some call center services include an automated component capable of providing callers with basic services and information, and an agent component for more complex or personalized information and services. Additionally, some call centers attempt to ensure quality control by monitoring or recording calls. However, such attempts often include several deficiencies. Examples of such deficiencies include an inability to adequately manage the recording or monitoring of calls.

BRIEF DESCRIPTION OF THE DRAWINGS

FIG. 6 is a diagram of an example system for call recording management and control according to one or more implementations described herein.

DETAILED DESCRIPTION OF PREFERRED EMBODIMENTS

The following detailed description refers to the accompanying drawings. The same reference numbers in different drawings may identify the same or similar elements.

In one or more implementations, described herein, devices may be used to manage and control recording operations in an interactive voice response (IVR) environment.

Figure 1:
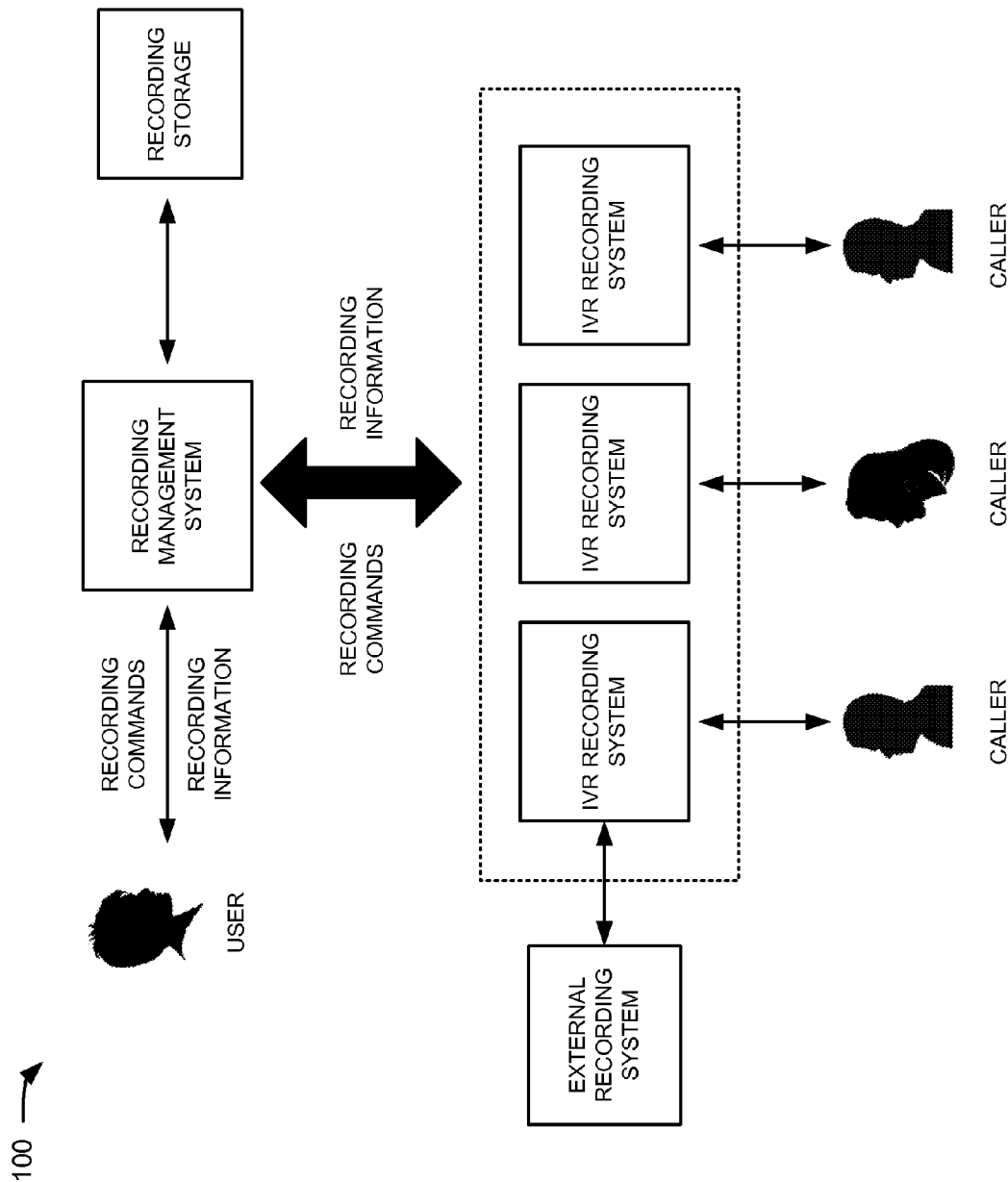
FIG. 1 is a diagram of an overview of an implementation described herein.

FIG. 1 is a diagram of an overview 100 of an implementation described herein. As depicted, a user may communicate a recording command (also referred to herein as "a record order") to a recording management system. The recording command may include a request to record a communication session (e.g., a call) between an IVR recording system and a caller. The recording management system may identify the IVR recording system corresponding to the recording command and communicate the recording command to the IVR recording system.

The IVR recording system may record the communication session specified by the recording command and notify the recording management system once the communication session has been recorded. The IVR recording system may also provide information to the recording management system regarding the recorded communication session. For example, the IVR recording system may provide the recording management system with record metadata and/or record data. Examples of record metadata may include information about the communication session (e.g., a call start time, a call end time, identification information regarding the caller, identification information regarding the communication session, information provided by the caller, information provided to the caller, etc.). Examples of record data may include an actual recording of the communication session or one or more portions of the communication session. In some implementations, the recording management system may also, or alternatively receive information (e.g., record metadata and/or record data) from an external recording system that may be cooperating with the IVR recording system to record a call or communication session. The recording management system may store the information received from the IVR recording system (and/or external recording system) in a recording storage.

The recording management system may also, or alternatively, provide the information, regarding the communication session, to the user. For example, the recording management system may notify the user that a particular communication session or group of communication sessions has been recorded. The recording management system may also, or alternatively, provide record metadata and/or record data corresponding one or more communication sessions. In some implementations, the recording management system may inform the user of an ongoing communication session and enable the user to listen to, or otherwise participate in, the ongoing communication session.

As such, one or more of the implementations, discussed herein, provide solutions to managing and controlling recording capabilities for multiple IVR recording systems. For example, one or more implementations discussed herein may enable a user to specify one or more communication session for recording and monitoring. Additionally, or alternatively, one or more implementations discussed herein may enable a user to receive information about a communication session (e.g., receive record metadata), listen to a copy of a recorded communication session (e.g., receive record data), or listen to an ongoing communication session.

Figure 2:
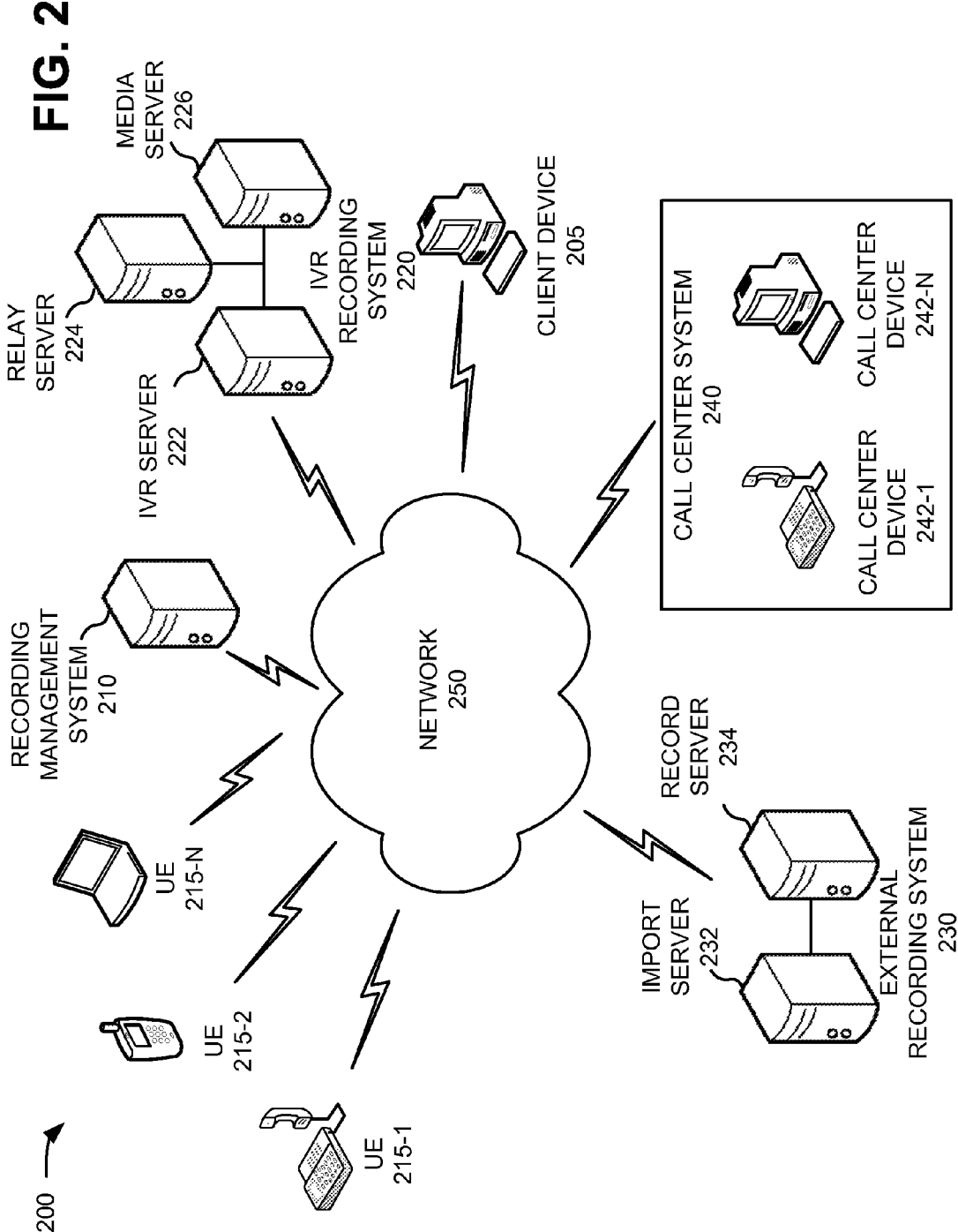
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 205, recording management server 210, UEs 215-1, 215-2, . . . , 215-N (where N≥1) (collectively referred to as "UEs 215," and individually as "UE 215"), IVR recording system 220, external recording system 230, call center system 240, and network 250. While FIG. 2 shows a particular number and arrangement of systems, networks, and devices, in alternative implementations, environment 200 may include additional systems, networks or devices, fewer systems, networks or devices, different systems, networks or devices, or differently arranged systems, networks or devices than those depicted. Moreover, one or more systems, networks, or devices may perform a task described as being performed by another system, network, or device.

Client device 205 may include one or more of a variety of computing or communication devices. For instance, client device 205 may include a smart phone, a laptop computer, a tablet computer, a desktop computer, a personal data assistant (PDA), and/or another type of computing or communication device. Client device 205 may be capable of operating in a manner that is consistent with the systems, environments, devices, processes, and operations described herein. For example, client device 205 may communicate record orders (e.g., instructions to record one or more communication sessions or one or more types of communication sessions) to recording management system 210. Client device 205 may also, or alternatively, be capable of receiving recording information from recording management system 210.

Recording management system 210 may include one or more of a variety of computing or communication devices. For example, recording management system 210 may include a desktop computer, a server, a cluster of servers, or another type of computing or communication device. In some implementations, for example, recording management system 210 may include a transaction server, a storage device that stores record metadata and/or record data, a web server, and/or one or more other types of computing or communication devices. Additionally, or alternatively, recording management server 210 may be capable of operating in a manner that is consistent with the systems, environments, devices, processes, and operations described herein. For instance, recording management system 210 may receive record orders from client device 205, communicate record orders to IVR recording system 220, monitor record orders, provide client device 205 with record order updates, and perform other functions or operations described herein.

UE 215 may include a variety of computing devices. For example, UE 215 may include a telephone, a smart phone, a laptop computer, a tablet computer, a desktop computer, a personal data assistant (PDA), and/or another type of computing or communication device. UE 215 may call or otherwise establish a communication session with IVR recording system 220 via network 250.

IVR recording system 220 may include a computer, a server, a cluster of servers, or another type of computing or communication device. For example, as illustrated, IVR recording system 220 may include IVR server 222, relay/record server 224, and media server 226. IVR server 222 may, for example, provide IVR services to communication sessions and/or provide other services relating to communication sessions. Relay/record server 224 may, for example, provide various services, such as recording communication sessions, communicating communication session recordings to external recording system 230, streaming communication sessions to external recording system 230, and/or updating IVR server 222 with requests to record communication sessions (e.g., call orders). Relay/record server 224 may also provide additional services, including cooperating with IVR server 222 to establish recordable communication sessions, collecting usage information for billing purposes, or other services. Media server 226b may provide audio tracks and/or other types of media for IVR services.

IVR recording system 220 may enable a communication session, or portion thereof, to be recorded. For example, IVR recording system 220 may enable a communication session to be recorded by recording the communication session locally and communicating the recorded communication session to external recording system 230. In another example, IVR recording system 220 may enable a communication session to be recorded by establishing a connection with external recording system 230 and streaming the communication session to external recording system 230.

In another example, IVR recording system 220 may enable a communication session to be recorded by out-dialing the communication session to call center system 240. Out-dialing a communication session may include various operations (e.g., a dial-out operation, a forwarding operation, a call session patching operation, etc.) capable of placing UE 215 in communication with call center system 240. Additionally, or alternatively, out-dialing a communication session may cause a communication session tap to be placed on the communication session, which may enable the communication session to be recorded by external recording system 230. IVR recording system 220 may include an Internet Protocol (IP) IVR system or an IVR system based on another type of technology such as an IVR recording system connected to a public switched telephone network (PSTN) communication system.

External recording system 230 may include computing devices, such as a computer, a server, a cluster of servers, or another type of computing device. Additionally, or alternatively, external recording system 230 may include a router, a switch, a modem, a LAN, a virtual network, a wireless network, or other types of networks and/or network devices. For instance, as illustrated, external recording system 230 may include import server 232 and record server 234. Import server 234 may be capable of receiving data, corresponding to a communication session, from IVR system 220 and/or call center system 240. Examples of such data may include non-transitory data structures, such as record metadata, record data, and/or other call-related information.

Record server 234 may be capable of receiving and recording a data stream corresponding to a communication session from IVR recording system 220. In some implementations, record server 236 may also, or alternatively, communicate with IVR server 222 to establish a routing path for communicating the data stream from IVR recording system 220. In certain implementations, record server 236 may also, or alternatively, communicate with IVR recording system 220 to specify a time, a protocol, a manner, a form, or a format for communicating a data stream of a communication session.

Call center system 240 may include one or more of a variety of networks and/or devices. For example, call center system 240 may include a computer, a server, a cluster of servers, a telephone, a cellular telephone, a router, a switch, a local area network (LAN), a wireless network, a virtual network, or another type of network or device. As depicted, call center system 240 may also, or alternatively, include call center devices 242-1, . . . , 242-M (where M≥1) (collectively referred to as "call center devices 242," and individually as "call center device 242"), including computers, telephones, and other devices, which may be used by agents of call center system 240 to receive and service out-dialed communication sessions from IVR recording system 220. Call center system 240 may be a single call center located in a single geographic area and/or multiple call centers distributed across a geographic area.

Network 250 may be any type of network or combination of networks. For example, network 250 may include a LAN, a wide area network (WAN) (e.g., the Internet), and/or a telecommunications network (e.g., Long-Term Evolution (LTE) network, Global System for Mobile Communications (GSM) network, wideband code division multiple access (WCDMA) network, Universal Mobile Telecommunications System (UMTS) network, Code Division Multiple Access 2000 (CDMA2000) network, High-Speed Packet Access (HSPA) network, Worldwide Interoperability for Microwave Access (WiMax) network, etc.).

Additionally, or alternatively, network 250 may include a fiber optic (e.g., a FiOS) network, a metropolitan area network (MAN), an ad hoc network, a telephone network (e.g., a PSTN), a cellular network, or a voice over internet protocol (Voice over IP, VoIP) network. Network 250 may also, or alternatively, include additional networks, systems, devices, and/or other technologies to enable communications between client device 205, recording management system 210, UEs 215, IVR recording system 220, external recording system 230, and/or call center system 240.

Figure 3:
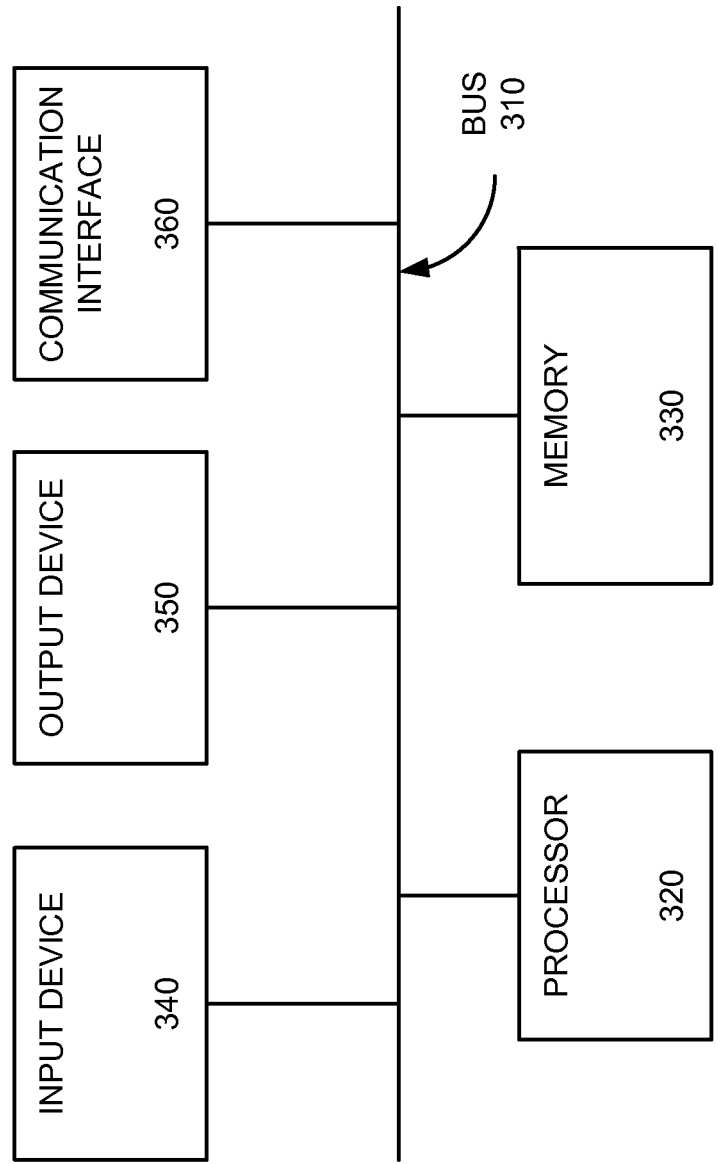
FIG. 3 is a diagram of example components of a device that may be used within the environment of FIG. 2.

FIG. 3 is a diagram of example components of a device 300 that may be used within environment 200 of FIG. 2. Device 300 may correspond to one or more of client device 205, recording management system 210, UE 215, IVR server 222, relay/record server 224, media server 226, import server 232, record server 234, and/or call center device 242. For example, in some implementations, client device 205, recording management system 210, UE 215, IVR server 222, relay/record server 224, media server 226, import server 232, record server 234, and/or call center device 242 may each include the components of FIG. 3; however, in other implementations, the components of FIG. 3 may be used to implement a combination of client device 205, recording management system 210, UE 215, IVR server 222, relay/record server 224, media server 226, import server 232, record server 234, and/or call center device 242. Further, each of client device 205, UE 215, IVR server 222, relay/record server 224, media server 226, import server 232, record server 234, and/or call center device 242 may include one or more devices 300.

As depicted, device 300 may include bus 310, processor 320, memory 330, input device 340, output device 350, or communication interface 360. However, the precise components of device 300 may vary between implementations. For example, depending on the implementation, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks (e.g., network 250). For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
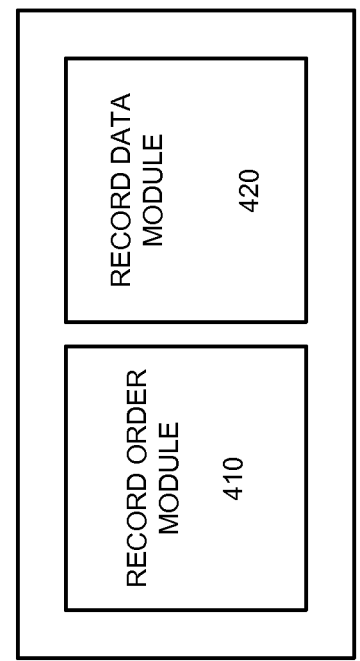
FIG. 4 is a diagram of example functional components of a recording management system according to one or more implementations described herein.

FIG. 4 is a diagram of example functional components of recording management system 210 according to one or more implementations described herein. As illustrated, recording management system 210 includes record order module 410 and record data module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

Record order module 410 may provide functionality with respect to record orders. For example, record order module 410 may enable recording management system 210 to provide a user interface to client device 205 and receive a record order from client device 210. Record order module 410 may also, or alternatively, enable recording management system 210 to provide the record order to IVR recording system 220. As mentioned above, a record order may include a request for IVR recording system 220 to record one or more calls or communication sessions.

As such, a record order may include a variety of information depending on the given scenario. For example, a record order may instruct IVR recording system 220 to record communication sessions indefinitely. Alternatively, a record order may instruct IVR recording system 220 to record a particular communication session or a particular type of communication session (e.g., communication sessions corresponding to a particular day or particular interval of time, communication sessions involving a particular caller or type of caller, communication sessions involving a particular agent or type of agent, communication sessions involving a particular user device or type of user device, communication sessions regarding a particular topic, communication sessions corresponding to a particular interactive voice response recording system, communication sessions corresponding to a particular type of information, etc.). Additionally, or alternatively, a record order may instruct IVR recording system 220 to being recording immediately, to begin recording at a particular date or time, or to only record communication sessions for a particular amount to time (e.g., the first 5 minutes of a communication session). A record order may also, or alternatively, instruct IVR recording system 220 to record a particular portion of a call or communication session (e.g., an IVR portion of the communication session, an agent portion of the communication session, etc.). As such, a record order may include a wide variety of requests for IVR recording system 220 to record communication sessions.

Record order module 410 may also, or alternatively, enable recording management system 210 to monitor one or more record orders. For example, record order module 410 may enable recording management system 210 to maintain a list of record orders and a status for each record order, indicating whether the record order is still pending or has been fulfilled by IVR recording system 220. Record order module 410 may also, or alternatively, enable recording management system 210 to provide client device 205 with information regard the status of one or more record orders. Accordingly, record order module 410 may enable recording management system 210 to provide a variety of one or more functionalities relating to record orders.

Record data module 420 may provide functionality with respect to record data and/or record metadata. For instance, record data module 420 may enable recording management system 210 to receive record data and/or record metadata from IVR recording system 220. As mentioned above, record data may correspond to actual recordings (e.g., audio files) of one or more parts of a call or communication session, and record metadata may correspond to one or more types of data describing characteristics of a particular call or communication session (e.g., a communication session identifier, a start time, an end time, an agent identifier, user device identifier, information received from the caller, information provided to the caller, etc.). Record metadata may also, or alternatively, indicate a storage location of corresponding record data.

Record data module 420 may also, or alternatively, enable recording management system 210 to receive a request for record data and/or record metadata from client device 205. In such implementations, the record metadata may be stored locally by recording management system 210, or externally by IVR recording system 220 or an alternative storage device. As such, record data module 420 may cause recording management system 210 to receive or retrieve the data (e.g., the record data and/or record metadata) and provide the data to client device 205.

In some implementations, since recording management system 210 may manage or control multiple IVR recording systems 220, recording management system 210 may collect record metadata corresponding to each recorded communication session, but leave the corresponding record data to be stored by the corresponding IVR recording system 220. Centralizing record metadata without centralizing record data may enable record management system 210 to locate any record data without causing the network congestions that could result from attempting to centralize the record data as well as the record metadata. Accordingly, record data module 420 may provide various types of functionality with respect to record data and/or record metadata.

In addition to the functionality described above, functional components of recording management system 210 may also, or alternatively, provide functionality as described elsewhere in this description. Further, while FIG. 4 shows a particular number and arrangement of modules, in alternative implementations, recording management system 210 may include additional modules, fewer modules, different modules, or differently arranged modules than those depicted.

Figure 5:
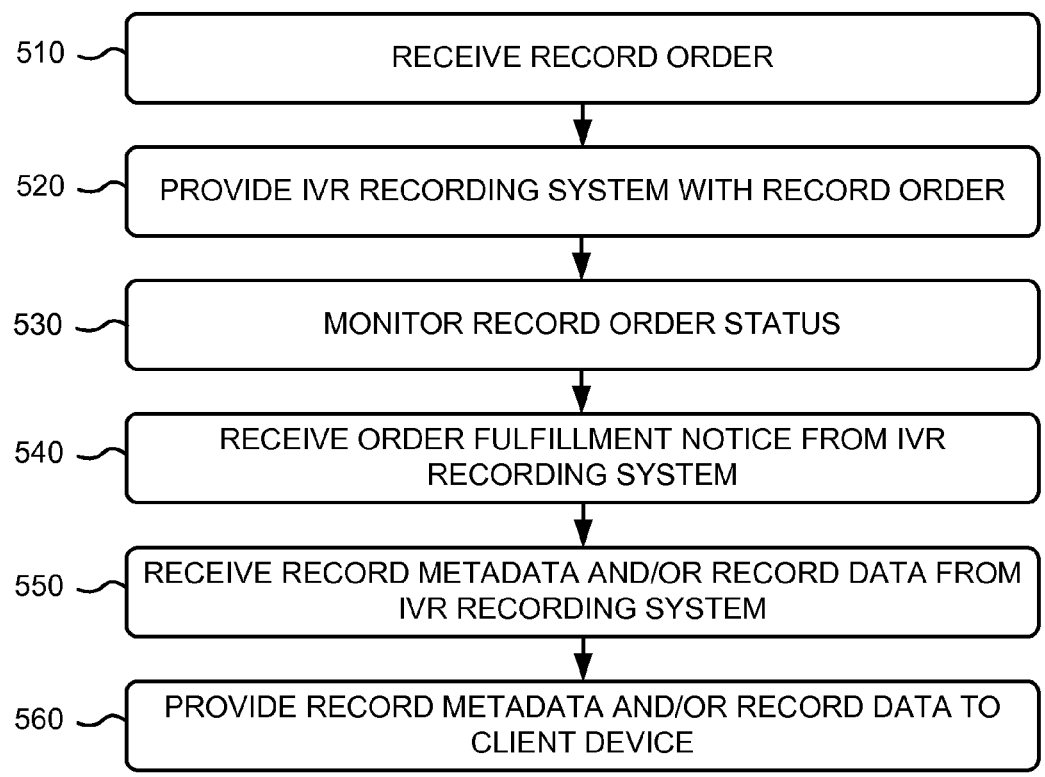
FIG. 5 is a diagram of an example process for managing call recordings according to one or more implementations discussed herein.

FIG. 5 is a flowchart diagram of an example process 500 for managing call or communication session recordings according to one or more implementations discussed herein. In one or more implementations, process 500 may be performed by one or more components of recording management system 210. In other implementations, one or more blocks of process 500 may be performed by one or more other components/devices, or a group of components/devices, including or excluding recording management system 210.

A record order may be received (block 510). For example, recording management system 210 may receive a record order. In some implementations, as mentioned above, the record order may include a request to record one or more communication sessions or telephone calls handled at IVR system 220. Recording management system 210 may provide a user interface to client device 205 and the record order may be received from a user that is operating client device 205.

The record order may be provided to IVR recording system 220 (block 520). For instance, recording management system 210 may provide the record order to IVR system 220. In some implementations, recording management system 210 may identify a particular IVR recording system 220, among several IVR recording systems 220, for executing or fulfilling the record order. Recording management system 210 may also, or alternatively, maintain a copy or record of the record order to maintain a complete registry of record orders.

A status of the record order may be monitored (block 530). For example, recording management system 210 may monitor whether the record order has been fulfilled. In some implementations, recording management system 210 may make record orders, and the status of one or more record orders, available to client device 205. Making record orders accessible or otherwise available to client device 205 may enable a user or operator of client device 205 to be informed about one or more record orders.

An order fulfillment notice may be received from IVR recording system 220 (block 540). For instance, recording management system 210 may receive a communication from IVR recording system 220 that the record order has been fulfilled. In response, recording management system 210 may update a status of the corresponding record order.

Record metadata and/or record data may be received from IVR recording system 220 (block 550). For example, recording management system 210 may receive record metadata and/or record data from IVR recording system 220. As mentioned previously, the record metadata may include information about the call or communication session (e.g., start time, end time, information provided by the caller, information provided to the caller, etc.). As is also mentioned above, the record data may include one or more recorded portions of the call or communication session.

In some implementations, recording management system 210 may receive record metadata corresponding to each call or communication session and store the record metadata in a centralized repository. In such implementations, recording management system 210 may not receive the corresponding record data; however, the record metadata may include information on where the record data is being stored (e.g., which IVR recording system 220 is storing the record data). In such implementations, recording management system 210 may obtain access to record data based on the centrally stored record metadata.

Record metadata and/or record data may be provided (block 560). For instance, recording management system 210 may provide record metadata and/or record data to client device 205. In some implementations, recording management system 210 may provide the record metadata and/or record data to client device 205 based on information contained in the record order received from client device 205. In other implementations, recording management system 210 may provide record order status information and/or record metadata to client device 205, and client device 205 may request additional record metadata and/or record data from recording management system 210. As mentioned above, in some implementations, the record metadata may be stored by recording management system 210 in a centralized storage device (or devices) and the corresponding record data may be stored by IVR recording system 220. As described in greater detail below, in certain implementations, recording management system 210 may provide the record metadata and/or record data to an alternative device, such as a secured file transfer protocol (SFTP) server.

While FIG. 5 shows a flowchart diagram of an example process 500 for managing call or communication session recordings, in other implementations, a process for managing call or communication session recordings may include fewer operations, different operations, differently arranged operations, or additional operations than depicted in FIG. 5.

FIG. 6 is a diagram of a recording system 600 for call recording management and control according to one or more implementations described herein. As depicted, system 600 includes client device 205, recording management systems 210-1, ..., 210-P (where P≥1) (hereinafter referred to collectively as "recording management systems 210," and individually as "recording management system 210"), UEs 215, IVR recording systems 220-1, ..., 220-R (where R≥1) (hereinafter referred to collectively as "IVR recording systems 220," and individually as "IVR recording system 220"), recording network infrastructure 610, SFTP server 620, and external storage location 630. While FIG. 6 shows a particular number and arrangement of systems, networks, and devices, in alternative implementations, recording system 600 may include additional systems, networks or devices, fewer systems, networks or devices, different systems, networks or devices, or differently arranged systems, networks or devices than those depicted.

Recording network infrastructure 610 may include one or more electronic devices (e.g., desktop computers, servers, clusters of servers, routers, hubs, storage devices, etc.) that are connected to one another via one or more types of network connections. As depicted, recording network infrastructure 610 may include one or more recording management systems 210 depending on the implementations. In addition to performing the functions and/or operations discussed throughout this description, recording management system 210 may perform data replication operations, where the record data and/or record metadata stored by one recording management system 210 is replicated to another recording management system 210 so that both recording management systems 210 include redundant data. Doing so may increase data availability within system 600, in addition to contributing to a more robust system (e.g., in case one recording management system 210 crashes, becomes inoperable, or otherwise fails). External data storage 630 may include any type of external storage device or group of external storage devices capable of storing record data and/or record metadata. In some implementations, external data storage 630 may be accessible by one or more devices, including client device 205, SFTP server 620, UE 215, or another type of device.

As depicted in the example of FIG. 6, client device 205 may communicate record orders to one or more recording management systems 210 of recording network infrastructure 610. In some implementations, each recording management system 210 of recording network infrastructure 610 may include a web server (not shown in FIG. 6) to facilitate such communications. Recording management systems 210 may provide the record orders to one or more IVR recording system 220-1, which may record communication sessions with UEs 215 to fulfill the record orders and report back to recording management system 210 of recording network infrastructure 610. In some implementations, the recording may be performed by IVR recording system 220. In other implementations, the recording may be performed by external recording system 230 based on data streamed from IVR recording system 220. In yet other implementations, the recording may be performed by a combination of IVR recording system 220 and external recording system 230.

As is also depicted in the example of FIG. 6, UE 215 may connect to IVR recording system 220 via PSTN. IVR recording systems 220, recording network infrastructure 610, and recording management system 210 may be part of an internal network, such as service provider network. Client device 205, SFTP server 620, and external recording system 230 may be part of the same, or different, private networks, and client device, SFTP server 620, and external recording system 230 may communicate with one or more systems or devices of the internal network via the Internet. In other implementations, however, one or more of the systems or devices of FIG. 6 may correspond to one or more other networks. For example, in some implementations, UEs 215 may communicate with IVR recording systems 220 via an IP network, such as the Internet.

As mentioned above, in some implementations, record data of recorded calls or recorded communication sessions may be stored locally by IVR recording systems 220 and/or external recording system 230. Doing so may limit the amount of network congestion that might otherwise be caused by attempting to centralize all of the recordings in recording system 600. However, in order to ensure that the record data is accessible by, for example, recording management system 210, client device 205, and/or SFTP server 620, IVR recording systems 220 may communicate record metadata to recording management systems 210, and the record metadata may include information identifying a storage location of the corresponding record data stored by IVR recording systems 220 and/or external recording system 230. Additionally or alternatively, recording management systems 210 of recording network infrastructure 610 may replicate the record metadata received by each recording management system 210 so that each recording management system 210 has access to a complete set of record metadata.

In some implementations, recording management system 210 may receive a record order or another type of request from client device 205 (or from another device in communication with recording network infrastructure 610) to move one or more sets of record metadata and/or record data to another location. For example, in some implementations, a request may be received from client device 205 to move record data and/or record metadata to external storage location 630, which may be accessible by one or more user devices or other types of devices (not shown in FIG. 6). In other implementations, a request may be received from client device 205 to move record data and/or record metadata to SFTP server 620, which may also, or alternatively, be accessible by one or more user devices or other types of devices. In some implementations, being able to move particular sets of record data and/or record metadata in response to particular requests may permit recording system 600 to be flexible in making recording information available without creating the network congestion that would result from moving all data to different locations as a matter of network policy.

In light of the above, one or more of the implementations, discussed herein, provide solutions to managing and controlling recording capabilities for IVR recording systems. For example, one or more implementations discussed herein may enable a user to specify one or more communication session for recording and monitoring. Additionally, or alternatively, one or more implementations discussed herein may enable a user to receive information about a communication session (e.g., receive record metadata), listen to a copy of a recorded communication session (e.g., receive record data), or listen to an ongoing communication session (e.g., by creating a communication path between recording management system 210 and the client device 205, SFTP server 620, or another type of device). Further, one or more implementations discussed herein may enable a user to control the portions of a call or communication session that are recorded and dictate a location for storing record metadata and/or record data corresponding to the call or communication session.

It will be apparent that example aspects, as described above, may be implemented in many different forms of software, firmware, and/or hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a record order from a client device,
      where the record order comprises recording instructions for a communication session involving an interactive voice response recording system;
      identifying the interactive voice response recording system from a plurality of interactive voice response recording systems based on information provided in the record order;
   providing, by the computing device, the record order to the identified interactive voice response recording system;
   receiving, by the computing device, record metadata corresponding to the communication session in response to providing the record order to the identified interactive voice response recording system,
      where:
         the record metadata comprises a storage location of record data corresponding to the communication session, and
         the record data comprises a recording of the communication session; and
   storing, by the computing device, the record metadata.

2. The method of claim 1, further comprising:
   prior to receiving the record metadata corresponding to the communication session,
   monitoring a status corresponding to the record order,
      where the status corresponding to the record order comprises an indication of whether the communication session involving the identified interactive voice response recording system has been recorded;
   receiving an indication, from the identified interactive voice response recording system, that the communication session has been recorded; and
   updating the status corresponding to the record order to indicate that the communication session has been recorded.

3. The method of claim 2, further comprising:
   prior to monitoring the status corresponding to the record order,
      communicating the status corresponding to the record order to the client device; and
   after updating the status corresponding to the record order, communicating the updated status to the client device.

4. The method of claim 1, further comprising:
   receiving a request from the client device to relocate the record data corresponding to the communication session;
   identifying the storage location of the record data based on the record metadata corresponding to the communication session; and
   relocating the record data according to the request from the client device to relocate the record data.

5. The method of claim 4, where:
   the request from the client device to relocate the record data comprises a request to provide a copy of the record data to the client device,
   the request from the client device to relocate the record data comprises a request to provide the copy of the record data to a secure file transfer protocol server, or
   the request from the client device to relocate the record data comprises a request to provide the copy of the record data to a particular data storage device that is external to the computing device and the identified interactive voice response recording system.

6. The method of claim 1, where:
   the record metadata, corresponding to the communication session, indicates that the record data, corresponding to the communication session, is stored by the identified interactive voice response recording system, or
   the record metadata, corresponding to the communication session, indicates that the record data, corresponding to the communication session, is stored by an external recording system.

7. The method of claim 1, where:
   the record order comprises a request to record a particular communication session,
   the record order comprises a request to record one or more communication sessions involving a particular user device,
   the record order comprises a request to record one or more communication sessions corresponding to a particular type of user device,
   the record order comprises a request to record one or more communication sessions occurring over an interval of time specified by the record order,
   the record order comprises a request to record one or more communication sessions corresponding to a particular caller,
   the record order comprises a request to record one or more communication sessions corresponding to a particular type of caller, the record order comprises a request to record one or more communication sessions corresponding to a particular agent, the record order comprises a request to record one or more communication sessions corresponding to a particular type of agent, the record order comprises a request to record one or more communication sessions corresponding to a particular interactive voice response recording system, the record order comprises a request to record one or more communication sessions corresponding to a particular type of information, the record order comprises a request to record an interactive voice response portion of one or more communication sessions, the record order comprises a request to record an agent portion of one or more communication sessions, or the record order comprises a request to record a caller portion of one or more communication sessions.

8. The method of claim 1, further comprising:

notifying the client device of an ongoing communication session;

receiving a request from the client device to listen to the ongoing communication session; and providing ongoing record data, corresponding to the ongoing communication session, to the client device.

9. The method of claim 1, where:

the record metadata is received from the identified interactive voice response recording system, or the record metadata is received from an external recording system used to record the communication session.

10. The method of claim 1, where:

the computing device comprises a recording management system, and the method further comprises:

providing the record metadata corresponding to the communication session to another recording management system; and receiving record metadata corresponding to another communication session from the other recording management system; and storing the record metadata corresponding to the other communication session.

11. A computing device, comprising:

a memory to store instructions; and a processor, connected to the memory, to:

receive a record order from a client device, where the record order comprises recording instructions, corresponding to a communication session, for an interactive voice response recording system, identify the interactive voice response recording system from a plurality of interactive voice response recording systems based on information provided in the record order, provide the record order to the identified interactive voice response recording system, receive record metadata, corresponding to the communication session, in response to the record order provided to the identified interactive voice response recording system, where:

the record metadata comprises a storage location of record data corresponding to the communication session, and the record data comprises a recording of the communication session;

store the record metadata locally, and cause the record data, corresponding to the communication session, to be stored at the storage location specified by the client device.

12. The computing device of claim 11, where the processor is to:

monitor a status corresponding to the record order, where the status corresponding to the record order comprises an indication of whether the communication session has been recorded, receive an indication, from the identified interactive voice response recording system, that the communication session has been recorded, and update the status corresponding to the record order to indicate that the communication session has been recorded.

13. The computing device of claim 12, where the processor is to:

communicate the status corresponding to the record order to the client device, and communicate the updated status to the client device.

14. The computing device of claim 11, where the storage location specified by the client device comprises:

the client device, a secure file transfer protocol server, or a particular data storage device that is external to the computing device and the interactive voice response computing system.

15. The computing device of claim 11, where:

the record metadata, corresponding to the communication session, indicates that the record data, corresponding to the communication session, is stored by the identified interactive voice response recording system, or the record metadata, corresponding to the communication session, indicates that the record data, corresponding to the communication session, is stored by an external recording system.

16. The computing device of claim 11, where:

the record order comprises a request to record a particular communication session, the record order comprises a request to record one or more communication sessions involving a particular user device, the record order comprises a request to record one or more communication sessions corresponding to a particular type of user device, the record order comprises a request to record one or more communication sessions occurring over an interval of time specified by the record order, the record order comprises a request to record one or more communication sessions corresponding to a particular caller, the record order comprises a request to record one or more communication sessions corresponding to a particular type of caller, the record order comprises a request to record one or more communication sessions corresponding to a particular agent, the record order comprises a request to record one or more communication sessions corresponding to a particular type of agent, the record order comprises a request to record one or more communication sessions corresponding to a particular interactive voice response recording system, the record order comprises a request to record one or more communication sessions corresponding to a particular type of information, the record order comprises a request to record an interactive voice response portion of one or more communication sessions, the record order comprises a request to record an agent portion of one or more communication sessions, or the record order comprises a request to record a caller portion of one or more communication sessions.

17. One or more non-transitory computer-readable storage media, comprising:
- one or more instructions that, when executed by a processor, cause the processor to receive a record order from a client device,
  - where the record order comprises recording instructions, corresponding to a communication session, for an interactive voice response recording system,
- one or more instructions that, when executed by a processor, cause the processor to identify the interactive voice response recording system from a plurality of interactive voice response recording systems based on information provided in the record order;
- one or more instructions that, when executed by a processor, cause the processor to provide the record order to the identified interactive voice response recording system;
- one or more instructions that, when executed by a processor, cause the processor to receive record metadata corresponding to the communication session,
  - where:
    - the record metadata comprises a storage location of record data corresponding to the communication session, and
    - the record data comprises a recording of the communication session; and
- one or more instructions that, when executed by a processor, cause the processor to store the record metadata locally.

18. The computer-readable storage media of claim 17, further comprising:
- one or more instructions that, when executed by a processor, cause the processor to receive a request from the client device to relocate the record data corresponding to the communication session;
- one or more instructions that, when executed by a processor, cause the processor to identify the storage location of the record data based on the record metadata corresponding to the communication session; and
- one or more instructions that, when executed by a processor, cause the processor to relocate the record data according to the request from the client device to relocate the record data.

19. The computer-readable storage media of claim 18, where:
- the request from the client device to relocate the record data comprises a request to provide a copy of the record data to the client device,
- the request from the client device to relocate the record data comprises a request to provide a copy of the record data to a secure file transfer protocol server, or
- the request from the client device to relocate the record data comprises a request to provide a copy of the record data to a particular data storage device that is external to the computing device and the interactive voice response computing system.

* * * * *